US012770324B2

(12) United States Patent
Kotzur et al.

(10) Patent No.: US 12,770,324 B2
(45) Date of Patent: Oct. 20, 2026

(54) POINT CLOUD AIDED CALIBRATION OF A COMBINED GEODETIC SURVEY INSTRUMENT

(71) Applicant: LEICA GEOSYSTEMS AG, Heerbrugg (CH)

(72) Inventors: Norbert Kotzur, Altstätten (CH); Markus Geser, Horn (CH); Bernd Möller, Lüchingen (CH); Hans-Martin Zogg, Uttwil (CH); Richard Ostridge, Rebstein (CH); Hannes Maar, Dornbirn (AT); Shane O'Regan, Heerbrugg (CH)

(73) Assignee: LEICA GEOSYSTEMS AG, Heerbrugg (CH)

( * ) Notice: Subject to any disclaimer, the term of this patent is extended or adjusted under 35 U.S.C. 154(b) by 275 days.

(21) Appl. No.: 18/382,873

(22) Filed: Oct. 23, 2023

(65) Prior Publication Data

US 2024/0135641 A1 Apr. 25, 2024
US 2024/0233258 A9 Jul. 11, 2024

(30) Foreign Application Priority Data

Oct. 24, 2022 (EP) .................................... 22203412

(51) Int. Cl.
*G06T 17/00* (2006.01)
*G01S 17/08* (2006.01)
(Continued)

(52) U.S. Cl.
CPC .............. *G06T 17/00* (2013.01); *G01S 17/08* (2013.01); *G06T 7/11* (2017.01); *G06T 7/70* (2017.01)

(58) Field of Classification Search
CPC ... G06T 17/00; G06T 7/11; G06T 7/70; G01S 17/08
See application file for complete search history.

(56) References Cited

U.S. PATENT DOCUMENTS 8,553,212 B2 10/2013 Jaeger et al.
8,629,905 B2 * 1/2014 Svanholm ................ G01C 1/04 348/135

(Continued)

FOREIGN PATENT DOCUMENTS

EP 2 404 137 A1 1/2012
EP 3 495 769 B1 1/2021

(Continued)

OTHER PUBLICATIONS

Extended European Search Report dated Apr. 12, 2023 as received in Application No. 22203412.6.

*Primary Examiner* — Xiao M Wu
*Assistant Examiner* — Ahmed Taha
(74) *Attorney, Agent, or Firm* — Maschoff Brennan

(57) ABSTRACT

A survey instrument comprising a single point and a point cloud measuring functionality, a communication interface, and a computing unit. The point cloud measuring functionality configured to emit a scanning beam along a first measuring axis and to advance the first measuring axis along a scanning pattern. The point cloud measuring functionality is configured to generate point cloud data representing a setting. The single point measuring functionality is configured to emit a measuring beam along a second measuring axis. The first measuring axis is referenced to the second measuring axis. The communication interface is configured to receive model data representing at least a part of the setting and comprising referencing data to an external coordinate system. The computing unit is configured to identify cardinal features in the point cloud data as well as in the model data.

16 Claims, 6 Drawing Sheets

(51) Int. Cl.
*G06T 7/11* (2017.01)
*G06T 7/70* (2017.01)

(56) References Cited

U.S. PATENT DOCUMENTS

| | | | | |
|---|---|---|---|---|
| 9,658,335 | B2 | 5/2017 | Siercks et al. | |
| 10,365,352 | B2 * | 7/2019 | Nordenfelt | G01C 15/002 |
| 11,568,559 | B2 * | 1/2023 | Török | G01C 11/02 |
| 2020/0363202 | A1 | 11/2020 | Metzler et al. | |
| 2021/0049784 | A1 | 2/2021 | Török et al. | |

FOREIGN PATENT DOCUMENTS

| | | | |
|---|---|---|---|
| EP | 3 779 359 | A1 | 2/2021 |
| WO | 97/40342 | A2 | 10/1997 |
| WO | 2013/113759 | A1 | 8/2013 |

* cited by examiner

POINT CLOUD AIDED CALIBRATION OF A COMBINED GEODETIC SURVEY INSTRUMENT

FIELD

The present disclosure relates to a geodetic survey instrument comprising a single point measuring functionality, a point cloud measuring functionality, a communication interface, and a computing unit, and a method for a point cloud aided stationing of the geodetic survey instrument and a computer program product based on it.

BACKGROUND

To gain information from static or moving objects according to the geodetic accuracy standards, in particular with centimetre precision or better, geodetic survey instruments, in particular total stations (TPS), tachymeters and motorized theodolites, are commonly used. Such geodetic survey instruments are configured to provide spherical coordinates and/or derived Cartesian coordinates of one or more single points according to the geodetic accuracy standards.

TPS are a common class of geodetic survey instruments. By way of example TPS are presented from here on as a representative of generic geodetic survey instruments. The specific features of other types of geodetic survey instruments might be applied accordingly. TPS essentially comprise sighting, targeting and single point distance measuring elements, in particular laser rangefinders, and angle sensors, with accuracy in the range of angular seconds. From this point on, a "single point measuring functionality" is understood to be an ensemble of hardware and software components that can sight, aim and measure one or more individual points according to the geodetic accuracy standards. The components do not need to be integrated into a compact module to provide the single point measuring functionality, in particular the software components or the motorized axes might be comprised by a separate physical component. A part of the single point measuring functionality, in particular the optical measurement components, might be provided by a single, integrated sub-component of the TPS. Such components will be referred from here on as "single point measuring unit".

Contemporary TPS can also reference the instrument to an external coordinate system, in particular a global coordinate system, by precisely recording the reference marks in the environment. Upon determining an external coordinate system all operations may be referenced to this external coordinate system. By way of example coordinate data represent unreferenced relative coordinates from the survey instrument or equivalent data. Coordinate data referenced to an external coordinate system will be referred as referenced or absolute coordinate data from here on.

Referencing the TPS is typically a cumbersome, manual work. In one typical routine at least a coarse pose (position and orientation) of the TPS and the absolute position of the visible reference markers in the proximity has to be known. The reference markers might be reference markers of the Geodetic Control Network. The absolute pose of the TPS is then derived by targeting and measuring the said reference markers. This is typically carried out by manual targeting or by scanning the environment to seek and target such reference markers. E.g. EP 2 404 137 discloses such a scanning method.

In another well-known routine, typically utilized for construction sites, the TPS has to be stationed in reference to the relative reference system, e.g. to the construction project. Markers, e.g. pencil or chalk marks on the walls, or grid-line intersections on the floor, might not have a defined absolute position, but they are defined relative to the construction project. The TPS can station itself relative to these markers. Instead of markers the TPS might utilize physical references, e.g. a wall, a column, a corner or any convenient distinguishing feature.

Typical TPS are also equipped with a GNSS receiver. However, without an appropriate support infrastructure, e.g. base stations at referenced positions, the accuracy of the GNSS receivers are not fulfilling the geodetic accuracy requirements. Consequently, they can only provide a coarse pose data. Furthermore GNSS receivers require the presence of GNSS signals, which make them ill-suited e.g. for indoor survey tasks.

Contemporary TPS may also be equipped with a set of wireless modules which enable them to communicate with different types of external units. A non-exclusive list of external units comprises another survey instruments, handheld data acquisition devices, field computers or cloud services. In particular TPS may receive a digital model of the environment via the wireless module. EP 3 779 359 discloses an instrument comprising an interface for receiving a digital model of the environment and a method of referencing the instrument to the digital model.

To capture topographic information, in particular a surface of an object, on setting, in particular a building or a construction site, scanning methods are typically utilized. The topography is typically represented by a contiguous point cloud. A common method for scanning surfaces is the utilization of scanning instruments or modules, in particular laser scanners. The scanning instrument or module scans the surface of objects with a scanning beam, in particular laser-beam, and the topography is generated by combining the measured distance information with an emission angle of the scanning beam. From this point on, a "point cloud measuring functionality" is understood to be an ensemble of hardware and software components which can provide a contiguous point cloud representing a setting. A part of the point cloud measuring functionality, in particular the emission and detection of the scanning beam, might be provided by a distinct component with integrated elements. Such components will be referred from here on as "point cloud measuring module". Distinct, integrated components providing a part of both the point cloud measuring functionality and the single point measuring functionality will be referred from here on as "common measuring unit". By way of example laser scanners are presented from here on as generic modules or instruments comprising a point cloud measuring functionality. The specific features of other types of point cloud measuring modules or instruments, in particular time of flight cameras, might be applied accordingly.

Laser scanners and methods for their utilization are known in the prior art and are disclosed for example in WO 97/40342. The scanning is typically executed by deflecting the beam with an appropriate optical element, for example a fast rotating mirror. One typical utilization of the laser scanners is so that they are mounted on a fixed basis comprising at least one further motorized axis to change, measure and record the emission angle in two degrees of freedom.

The benefits of combining the "standard TPS", which can deliver high single point accuracy, with a dedicated point cloud measuring functionality, in particular laser scanners, which can deliver high point to point resolution is already recognized and known in the prior art. E.g. WO2013/

113759A1 or EP 3 495 769 B1 discloses a TPS having a single point and a point cloud measuring functionality. Laser scanners might be arranged as a separate module to the TPS. However, the point cloud and the single point measuring functionalities might utilize a common optical axis, in particular they might also comprise common hardware elements.

Additionally or alternatively 3D point clouds can also be provided by measuring a number of reference points from both a stationary position as well as from a free-hand position and/or by 2D- or 3D-image based path derivation using image processing techniques such as feature matching algorithms like SIFT (Scale Invariant Feature Transformation), SURF (Speeded Up Robust Features), FAST (Features from Accelerated Segment Test), BRIEF (Robust Independent Elementary Features) or ORB (Oriented FAST and Rotated BRIEF).

For TPS with a point cloud measuring functionality typical survey tasks comprises of providing a point cloud representing the setting. Typically a referencing of the point cloud is also necessary. Such referencing is carried out manually in the prior art.

In view of the above circumstances, the object of the present disclosure is to provide an automatized referencing of the survey instrument comprising a single point and a point cloud measuring functionality without manually targeting and measuring of reference markers.

SUMMARY

The disclosure relates to a survey instrument, in particular a TPS, a tachymeter, a theodolite, a laser tracker, or an indoor positioning system comprising a single point measuring functionality, a point cloud measuring functionality, a communication interface, and a computing unit.

The point cloud measuring functionality has a first measuring axis and configured to emit a scanning beam along the first measuring axis. The scanning beam might be a laser beam, in particular a pulsed laser beam. By way of example pulsed laser beam will represent from here on a generic scanning beam. The specific features of other types of scanning beams might be applied accordingly. The scanning beam might comprise a plurality of individual laser beams, in fan shaped, in conical or in any suitable alternative geometry. The first measuring axis might be defined for each of the plurality of individual beams separately, alternatively the first measuring axis might be an axis representing the ensemble of the plurality of individual laser beams. For reasons of brevity and transparency only point cloud measuring functionalities based on the emission of a single pulsed laser beam along the first measuring axis will be described in more detail. The present disclosure is, however, not limited to these cases and can be applied to any scanning beam geometry. Additionally the point cloud data might be provided on the basis of imaging methods, in particular by measuring a number of reference points from both a stationary position as well as from a free-hand position and/or by 2D- or 3D-image based path derivation using image processing techniques such as feature matching algorithms.

The point cloud measuring functionality is configured to generate point cloud data representing a setting. The point cloud data comprises coordinate data of a plurality of point cloud object points obtained by advancing the first measuring axis along a scanning pattern. Point cloud in the sense of the present disclosure means a dense point cloud. The scanning pattern is configured to provide the dense point cloud. The scanning pattern might represent a half dome or a full dome scan or also a certain window scan. The density of the point cloud object points might be inhomogeneous or anistropic. The scanning pattern might result from a fast, in particular at least 100 rpm, rotation along a first, in particular a horizontal tilting axis and a slow, in particular at most 25 rpm, rotation along a second axis perpendicular to the first axis, in particular a vertical rotation axis. Coordinate data of the point cloud object points might be in the form of spherical coordinates. The distance from the survey instrument might be provided on the basis of the time of flight measurement of the laser pulses, while the angular components might be provided on the basis of data provided by angle sensors of the survey instrument. Cartesian coordinates measured directly or derived from the spherical coordinates might also be utilized.

The single point measuring functionality has a second measuring axis and configured to emit a measuring beam along the second measuring axis. The first measuring axis is referenced to the second measuring axis. The survey instrument might comprise a distinct point cloud measuring module and a distinct single point measuring unit. The pose of the point cloud measuring module to the single point measuring unit might be adjustable between two measurements. The pose of the point cloud measuring module to the single point measuring unit might be determined in a calibration procedure. Such calibration procedures are known in the prior art. Alternatively, the survey instrument might comprise a common measuring unit. Thus, the first and the second measuring axes might be the same.

The single point measuring functionality is configured to target a single point target by aligning the second measuring axis to the single point target and to generate single point measurement data comprising coordinate data of the single point target. The single point measuring functionality might be configured to provide distance information based on the detection of the measuring beam reflected from the single point target, in particular by utilizing a laser range finding principle, in particular on the basis of an interference and/or a time of flight measurements. Coordinate data provided by the single point measuring functionality fulfil the geodetic accuracy standards.

The communication interface is configured to receive model data representing at least a part of the setting. The model data comprises referencing data. Referencing data in the sense of the present disclosure is data with position reference to an external, in particular global coordinate system. The model data might be a computer generated data, in particular a computer aided design (CAD) or building information model (BIM). Alternatively, the model data might be measurement data representing a previous state of the setting. The model data might comprise anchor points in the form position data for a network of markers, in particular retroreflective targets. The model data might represent a previous stage of the setting, i.e. some objects might be missing from the model data. Alternatively, the model data might represent a construction plan to be carried out and might comprise elements which are not yet present in the setting. The model data might be limited to objects of interest, i.e. a single building in an extended construction site, or might represent a simplified model, e.g. without decorative elements, or without the building services and connecting elements. The model data might also represent an ideal, error-free state of the objects of interest, while the acquired point cloud corresponds to the actual state.

The computing unit is configured to identify cardinal features in the point cloud data and being configured to identify cardinal features in the model data. Cardinal features in the sense of the present disclosure are features that can be utilized for assigning the acquired point cloud to the model data, in particular easily recognizable parts with well-defined geometry and/or visual appearance and/or position. By way of example cardinal features might be edges or corner with defined position, flat surfaces with defined geometry, reference markers, boreholes or pins. The skilled person could provide a similar or alternative list based on the actual survey environment and task. The computing unit is configured to carry out generic mathematical and data management operations.

The survey instrument is configured to execute a stationing functionality. The stationing functionality comprises the steps of 1.) retrieving the model data representing at least a part of the setting and comprising referencing data to the external coordinate system, 2.) acquiring the point cloud data representing the topography of the setting by the point cloud measuring functionality, 3.) identifying a plurality of cardinal features in the acquired point cloud data by the computing unit, 4.) merging the acquired point cloud data with the model data by finding correspondences between the identified cardinal features in the point cloud data and the respective cardinal features in the model data by the computing unit, 5.) providing referenced point cloud data based on the merging of the acquired point cloud data with the model data, 6.) deriving referenced pose data for the survey instrument based on the referenced point cloud data, and 7.) utilizing the referenced pose data of the survey instrument for performing subsequent operation of the single point and the point cloud measuring functionalities. Although the steps of the stationing are described here as a list with numbering, it is clear that these and all further numbers do not represent a temporal and spatial connection, not even in the form of a preferred sequence and merely serve the purpose of readability. The temporal sequence of such steps, and/or the spatial sequence of components, may be varied within the limits of expediency.

In some embodiments, the survey instrument comprises 1.) a base, 2.) a frame mounted on the base and configured to be rotatable relative to the base by a motorized rotation axis, wherein the motorized rotation axis provides a rotation for the first and second measuring axes, 3.) a single point measuring unit, in particular a common measuring unit, is mounted on a motorized tilting axis of the frame, wherein a.) the motorized tilting axis provides a tilting of the second measuring axis, in particular for common measuring units further provides a tilting of the first measuring axis and b.) the single point measuring unit, in particular the common measuring unit, comprises a laser rangefinder configured to provide a distance of the single point target to the survey instrument, in particular in the case of common measuring unit to further provide a distance of the point cloud object points to the survey instrument, 4.) a first angle sensor configured for providing rotation angle data for calculating the orientation of the first and second measuring axes, 5.) a second angle sensor configured for providing tilting angle data for calculating the orientation of the second measuring axis, and in particular for a common measuring unit the orientation of the first measuring axis.

In some embodiments the point cloud measuring functionality might utilize a point cloud measuring module arranged on the side and/or the top of the frame. The point cloud measuring module might comprise a rotating mirror for tilting the first measuring axis and a third angle sensor configured for providing a tilting angle data for calculating the orientation of the first measuring axis. The mirror might be a fast rotating mirror capable of achieving a rotation of 1000 rpm or more. Such embodiments are especially suitable for a fast scanning of the setting, however the present disclosure is not limited to these embodiments.

In some embodiments the first and second measuring axes are aligned to a common measuring axis, in particular the single point and the point cloud measuring functionalities might utilize a common measuring unit. The common measuring unit might have distinct hardware components to provide the single point and the point cloud measuring functionalities. The single point and the point cloud measuring functionalities might utilize a common laser diode, in particular they might utilize further common hardware components. These embodiments are especially beneficial as no alignment error between the point cloud measuring functionality and the single point measuring functionality might occur.

In some embodiments the stationing functionality further comprises 1.) selecting at least one identified cardinal features by the computing unit, 2.) targeting the at least one selected cardinal feature with the single point measuring functionality and generating single point measurement data comprising coordinate data of the at least one selected cardinal feature, 3.) updating the acquired point cloud data based on the single point measurement data comprising the coordinate data of the at least one selected cardinal features. These embodiments are especially beneficial since the single point measuring functionality can typically provide measurement data with higher accuracy than the point cloud measuring functionality. By selecting the appropriate features based on the acquired point cloud data the single point measuring functionality can synergistically support the generation of the point cloud.

In some embodiments the point cloud measuring functionality is configured to identify retroreflective targets in the setting, in particular by analyzing the reflected scanning beam. Retroreflective targets are especially suitable for the above mentioned measurements by the single point measuring functionality. By recording the retroreflective targets in the setting the point cloud measuring functionality might provide data for a shortened stationing at a next survey location.

In some embodiments the model data comprise position information of one or more retroreflective targets in the setting and the identified cardinal features comprising at least one retroreflective target. The stationing functionality further comprise the steps of 1.) targeting at least one of the at least one retroreflective targets comprised by the identified cardinal features with the single point measuring functionality and generating single point measurement data comprising coordinate data of at least one targeted retroreflective target, 2.) updating the acquired point cloud data based on the single point measurement data comprising the coordinate data of the at least one targeted retroreflective target. While retroreflective targets are especially suited to act as “anchor-points” the present disclosure might be utilized with other types of anchor-points. By way of example, anchor points might be pencil- or chalk marks or non-reflective tapes. Pencil and chalk marks as well as different tapes are widely utilized to mark different location in construction sites. Utilizing anchor points as cardinal features, in particular when the model data is previous survey data, with known anchor point positions, is especially beneficial for the matching of the point cloud with the model data. Despite all these benefits the present disclosure might be applied without anchor points.

In some embodiments the survey instrument comprises an inclinometer. In such embodiments the stationing functionality might further comprises the steps of 1.) providing a gravity vector by the inclinometer, 2.) updating the acquired point cloud data representing the topography of the setting based on the provided gravity vector. The survey instrument might monitor the changes of the gravity vector and provide a feedback when a significant change of the gravity vector is observed, e.g. the instrument has slipped or one or more feet sunken deeper in the soft ground. The instrument might provide an operator feedback regarding such events and might request a stationing. The instrument might comprise further sensors, in particular shock sensors.

Survey instruments comprising inclinometers or other equivalent sensors might benefit especially from the present disclosure. For such instruments the zenith direction of the acquired point cloud data and the model data can be independently aligned based on the provided gravity vector. The present disclosure might be beneficially applied in combination with vertical edges as cardinal features as those are parallel to each other in the model data and in the acquired point cloud data.

In some embodiments the survey instrument comprises a compass, in particular an electronic compass. In such embodiments the stationing functionality might further comprise the steps of 1.) providing a north direction by the compass, 2.) updating the acquired point cloud data representing the topography of the setting based on the provided north direction. Utilizing a compass in combination with the inclinometer is especially beneficial as it enables a complete alignment of the orientation of the model data with the acquired point cloud. Thus the acquired point cloud can be matched with the model data by a translation operation.

Despite these advantages the present disclosure might be applied without determining the gravity vector and/or the north direction. On the contrary, the present disclosure allows the stationing of the survey instrument on tilted ground as the correspondences between the identified cardinal features in the point cloud data and the respective cardinal features in the model data provide these data.

In some embodiments the survey instrument comprises an imaging functionality. The optical axis of the imaging functionality might define a third measuring axis such that third measuring axis is referenced to the second measuring axis. The imaging functionality might be provided by the components of the single point measuring unit and/or the common measuring unit, and the third measuring axis might be equal to the second measuring axis. The imaging functionality might be configured to detect construction markings, in particular pencil marks, and/or chalk marks, and/or non-reflective tapes, and to provide imaging data comprising targeting direction data of the identified construction markings. The model data might comprise coordinates of one or more construction markings, in particular wherein the model data is a previous survey of the same site. For such embodiments the stationing functionality might further comprises 1.) acquiring the imaging data by the imaging functionality 2.) merging the acquired imaging data with the model data by matching the targeting direction data of the identified construction markings with the respective coordinates of the construction markings in the model data, 3.) providing an assessment regarding the deviation of model data merged with the targeting direction data of the identified construction markings and the referenced point cloud data. The assessment might be an error message indicting that a stationing was not successful. Alternatively, the referenced point cloud data might be updated based on the respective coordinates of the construction markings in the model data.

In some embodiments the model data is 1.) a CAD 2.) a BIM, or 3.) previously measured referenced point cloud data representing a previous state of the setting.

The disclosure further relates to a stationing method for the geodetic survey instrument. The method comprises the steps of 1.) retrieving model data representing at least a part of the setting and comprising referencing data to an external coordinate system, 2.) acquiring point cloud data representing the topography of the setting, 3.) identifying a plurality of cardinal features in the acquired point cloud data, 4.) merging the acquired point cloud data with the model data by finding correspondences between the identified cardinal features in the point cloud data and respective cardinal features in the model data, 5.) providing the referenced point cloud data based on the merging of the acquired point cloud data with the model data, 6.) deriving referenced pose data of the survey instrument for performing subsequent operation of the single point and the point cloud measuring functionalities based on the referenced point cloud data.

In some embodiments the method comprises 1.) segmenting the referenced point cloud data into a plurality of fractions of the referenced point cloud data, 2.) providing a local matching index for at least one fraction of the referenced point cloud data, wherein the local matching index is based on a.) a weighted deviation of coordinate data of point cloud object points of the referenced point cloud data from the model data and/or b.) a weighted deviation of the identified cardinal features respectively in the referenced point cloud data and in the model data, 3.) reducing the referenced point cloud data by excluding fractions of the referenced point cloud data based on the local matching index, in particular wherein the local matching index exceeds a deviation threshold, 4.) updating the referenced point cloud data based on the merging of the reduced point cloud data with the model data, 5.) deriving referenced pose data for the survey instrument based on the updated referenced point cloud data.

In some embodiments the updated referenced point cloud data has a first reference framework, wherein reference framework might mean an absolute coordinate system or a coordinate system relative to the model data, and at least one excluded fraction has an improved local matching index, in particular below a deviation threshold, with respect to a second reference framework differing from the first reference framework. These embodiments might represent a situation, wherein an object is placed in the setting, however its pose is differing from the model pose. Such situation might arise when a complex construction part, e.g. reactor tank, a windmill blade, a pre-fabricated steel or concrete element etc., has already been transported to the construction site, bur not yet mounted on its final location and/or a piece of semi stationary machinery, e.g. a crane might have changed a pose. In such cases it is often desirable to carry out e.g. stake-out measurements on the part based on the model data, e.g. to verify manufacturing tolerances. The method might further comprise providing a feedback, in particular graphically indicate a misaligned object, regarding the excluded fraction with improved local matching index and the second reference framework. In particular the method might further comprise a step of requesting, and on approval performing an update for the model data on the basis of the pose of the misaligned object in the updated referenced point cloud.

In some embodiments of the method a matching algorithm providing a matching of the identified cardinal features in the point cloud data with the respective cardinal features in the model data is provided. The matching algorithm is configured to be trained by machine learning to associate the identified cardinal features in the point cloud data with the respective cardinal features in the model data based on an evaluation of the net matching index. The net matching index might be based on the local matching indexes, in particular a sum of them. The machine learning might be supervised or unsupervised. The machine learning might be based on training data, however embodiments, wherein the matching algorithm evaluates the operator actions regarding a proposed matching are also within the sense of the present disclosure. Such machine learning methods are especially useful if the actual scene deviates from the model data. Such deviations might be erroneously produced components, incomplete structures or the presence of auxiliary structures, in particular a scaffold or a formwork. In these cases some of the cardinal features in the point cloud and in the model data match with each other, however both the point cloud and the model data might comprise features which cannot be matched. A training session might comprise training with partially matching data.

In some embodiments the machine learning further comprises 1.) providing a score of applicability for each of the identified cardinal features, wherein the score of applicability of a given cardinal feature comprises information regarding an estimated reduction of the local and/or the net matching index by matching the given cardinal feature to the respective cardinal feature in the model data, 2.) providing a feedback to the machine learning based on the score of applicability and further based on the actual reduction of the local and/or the net matching index by matching the given cardinal feature to the respective cardinal feature in the model data. The estimated reduction might be an effective value, i.e. it might represent a probability of a successful matching on the basis of the given feature for a plurality of scenarios. Such scenarios might provide different conditions regarding e.g. 1.) the complexity of the setting, which might be characterized by the number of cardinal features, 2.) the degree of matching of the model data with the setting, which might be characterized by the proportion of non-matching features to the matching features, or a 3.) geometric matching, i.e. whether the zenith and/or the north direction of the model data and the acquired point cloud data show a reasonable matching. The matching algorithm might be trained on the basis of such metadata and might utilize the said metadata during the matching of the cardinal features of the acquired point cloud data and the model data. The score of applicability might be provided on the basis matching a single cardinal feature. The score of applicability might be provided for a group of cardinal features, in particular a group of retroreflectors, pencil or chalk marks or non-reflective tapes. In alternative wording, the score of applicability might characterize the uniqueness of the cardinal feature, i.e. an extended flat surface with a specific geometry might have higher score of applicability than a non-specific edge.

In some embodiments the machine learning further comprises a verification measurement. The verification measurement comprises the steps of 1.) selecting a set of verification features comprising one or more identified cardinal features in the model data, 2.) providing single point measurement data comprising coordinate data of the set of verification features by the single point measuring functionality, 3.) providing deviation data based on the respective coordinate data of the set of verification features measured by the single point measuring functionality and in the referenced point cloud data, 4.) providing matching quality data based on the deviation data, 5.) providing training information for the matching algorithm based on the matching quality data.

The present disclosure also relates to a computer program product. The computer program product comprises a program code stored on a machine-readable medium, or embodied by an electromagnetic wave comprising a program code segment. The computer program product has computer-executable instructions for performing the computational steps of a selected embodiment of the method, in particular when run on a computing unit of a system.

BRIEF DESCRIPTION OF THE DRAWINGS

By way of example only, specific embodiments will be described more fully hereinafter with reference to the accompanying figures, wherein.

DETAILED DESCRIPTION

Figure 1:
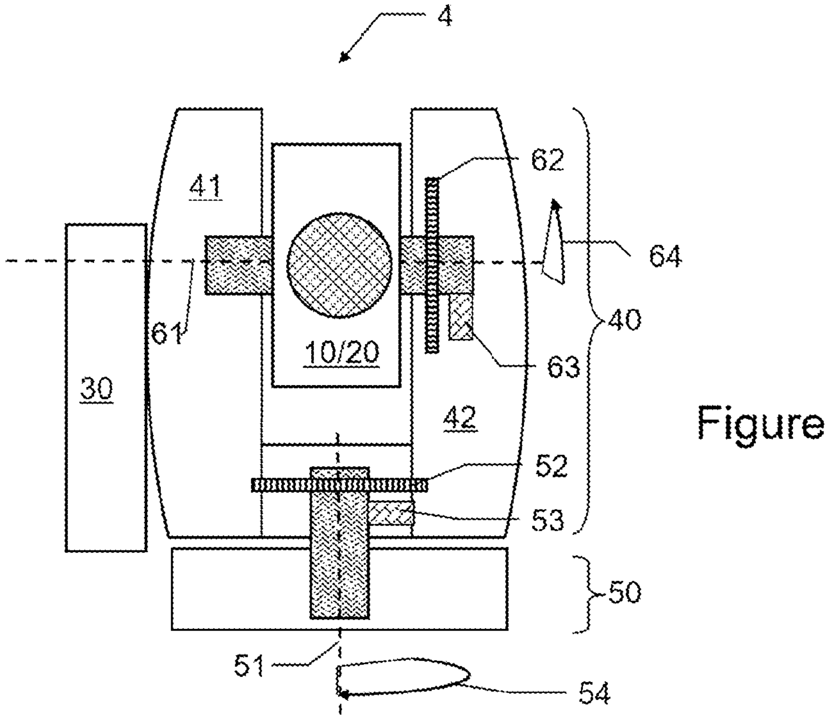
FIG. 1 shows an embodiment of the survey instrument comprising a common measuring module.

FIG. 1 shows a schematic depiction of a TPS 4 providing a single point measuring functionality and a point cloud measuring functionality with a common measuring unit 10/20 and a computing unit 30. The common measuring unit 10/20 might comprise distinct components to provide the single point and point cloud measuring functionalities. The common measuring unit 10/20 might have common hardware components, in particular a common laser diode to provide both the single point and point cloud measuring functionalities. By way of example the computing unit 30 is arranged to a frame 40 of the TPS 4. Embodiments where the single point and point cloud measuring functionality are provided by separate components are also within the sense of the present disclosure. Having the computing unit 30 as a separate entity is also possible. The computing unit 30 might be temporarily arrangeable on the TPS 4 for such embodiments.

The frame 40 of the TPS 4 comprises a first 41 and a second column 42, wherein the common measuring module 10/20 is attached to both columns 41,42 so that it is tiltable around a tilting axis 61. The tilting of the common measuring module 10/20 is preferably realized by a motorized axis 62. Manual tilting around the tilting axis 61 may also be possible under certain circumstances. The TPS 4 comprises a second angle sensor 63 configured to measure a tilting angle of the tilting axis 61 as the tilting angle of the second measuring axis 64.

In the FIG. 1*a* depicted embodiment the frame 40 is mounted on a base 50 and rotatable about a rotational axis 51. The rotation axis 51 might be a vertical axis during the calibration and measurement operations. The TPS 4 may be rotated manually under certain circumstances or preferably by a motorized axis 52. The TPS 4 comprises a first angle sensor 53 configured to measure a rotation angle 54 of the frame 40 relative to the base 50. The rotation angle 54 and the tilting angle of the second measuring axis 64 retrieved by the first 53 and second angle sensors 63 are transferred to the computing unit 30.

Figure 2:
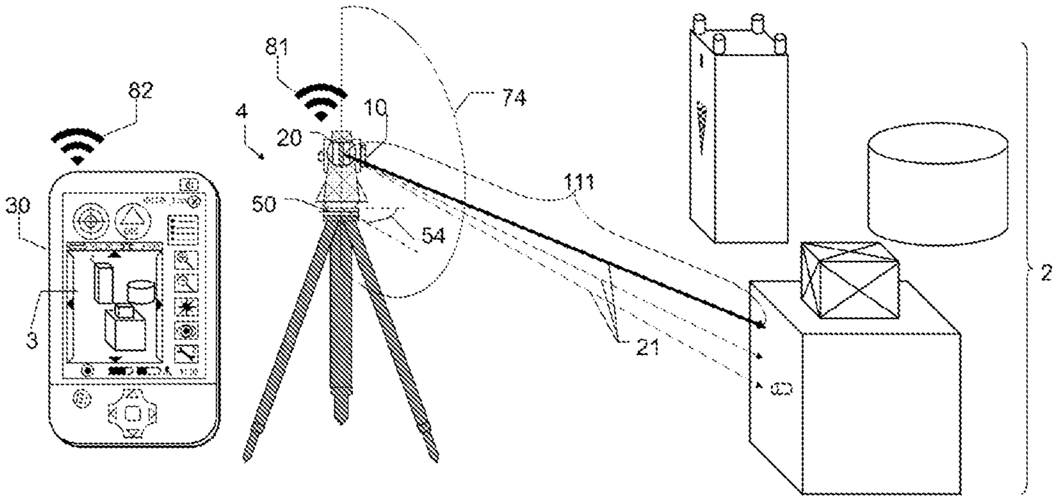
FIG. 2 shows the schematics of scanning a setting.

FIG. 2 shows a setting 2 comprising multiple objects. By way of example the TPS 4 is mounted rotatable on the base 50. The TPS 4 comprises a separate single point measuring unit 10, and a point cloud measuring module 20. The point cloud measuring module 20 is arranged laterally on the TPS 4.

In the depicted embodiment the point cloud measuring module 20 emits a scanning beam 21, in particular a laser beam, deflected by a beam deflecting element, in particular a motorized fast rotating mirror, to provide point cloud data 3. Coordinate data of a plurality of point cloud object points comprises tilting angle of a first measuring axis 74, and the rotation angle 54, and a distance 111 of the object point to the TPS 4.

In the depicted embodiment the computing unit 30 is realized as a separate unit comprising a wireless interface 82, while the TPS 4 comprises a further wireless interface 81. The wireless interfaces 81,82 are configured to allow an exchange of data between the computing unit 30 and the other components the TPS 4. Data exchange using a wired interface is also possible. The wireless interfaces 81,82, or wired interfaces with equivalent functionality, is configured to receive model data representing at least a part of the setting, wherein the model data comprises referencing data.

Figure 3:
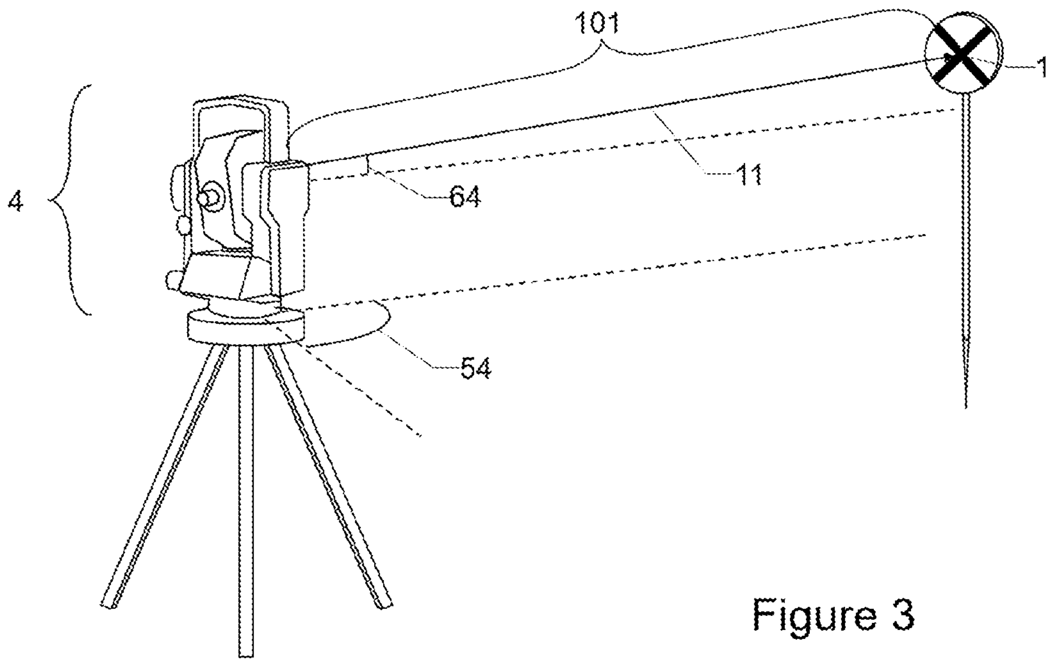
FIG. 3 depicts the measuring of single point measurement data.

FIG. 3 shows a TPS 4 generating single point measurement data with the single point measuring functionality by emitting a measuring beam 11, in particular a laser beam. The single point measurement data comprises a distance 101 from the TPS 4, the tilting angle 64, and the rotation angle 54 of the second measuring axis for one or more targeted single points 1, in particular wherein the one or more single points define a cardinal feature. The single point measurement functionality in the depicted embodiment generates the distance 101 from the TPS 4 via the principle of laser range finding, in particular time of flight measurement of a laser pulse or laser interferometry. The targeted object may be a reference marker or other types of identified cardinal features. For some types of cardinal features, in particular edges, or flat surfaces, multiple individual single point measurements may be required to derive their coordinates.

Figure 4:
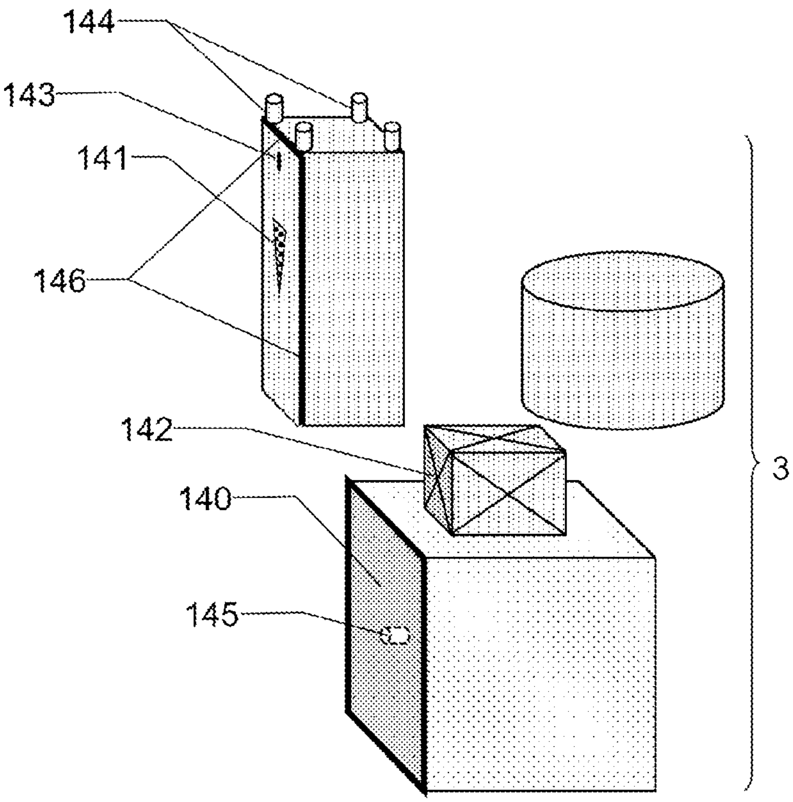
FIG. 4 shows examples of cardinal features identified in a point cloud.

FIG. 4 shows an illustrative, non-exclusive list of cardinal features 140-146 in the acquired point cloud 3 representing the setting. These might be flat surfaces with known geometry 140, reference markers 141, other referencing points, e.g. crossing of beam elements 142, pencil or chalk marks 143, pins 144 or boreholes 145, or other geometric features like edges 146. Patterns of features, e.g. a plurality of pins 144 in a specific arrangement, or edges 146 with a given geometric relation to each other might also act as cardinal features. The skilled person can provide a similar or alternative list depending on the actual survey task.

Figure 5:
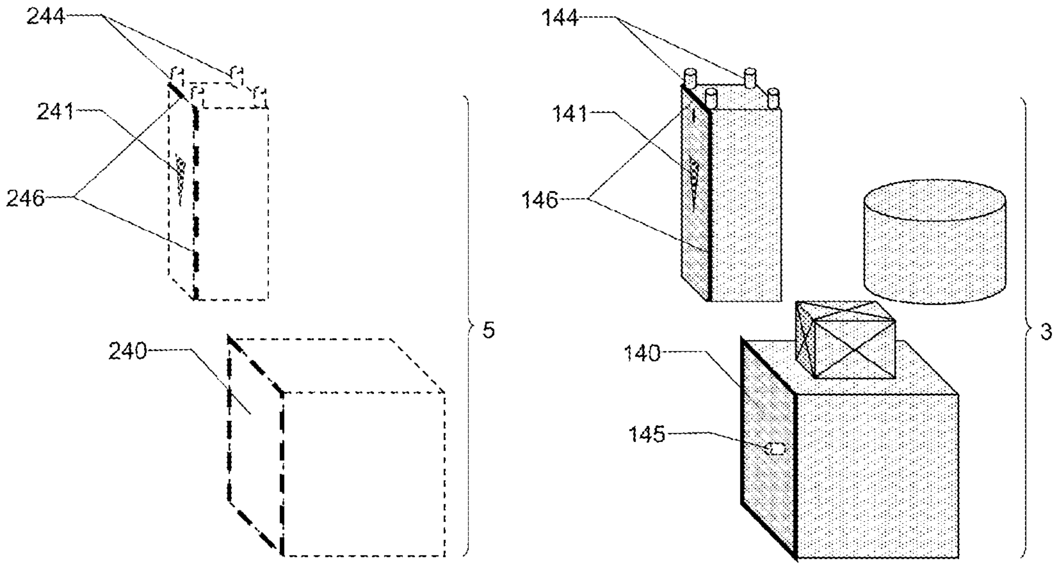
FIG. 5 shows model data representing at least a part of a setting and corresponding cardinal features in the model data with respective cardinal features in a point cloud.

FIG. 5 shows model data 5 representing at least a part of the setting with dashed lines and an acquired point cloud 3 with solid lines. The model data might represent a previous stage of the setting, i.e some object might be missing from the model data. Some objects might have different shapes, e.g. in the depicted example the drilling 145 is missing from the model data. Alternatively the model data 5 might represent a plan to be carried out and might comprise elements which are not yet present in the setting. The model data 5 might also represent an ideal error-free state of an object of interest, wherein the acquired point cloud 3 corresponds to an actual state. For the sake of transparency FIG. 5 depicts a case where the corresponding objects in the acquired point cloud 3 and the model data 5 have corresponding geometry. For similar reasons the model data 5 and the acquired point cloud 3 is shown without orientation difference. The person skilled in the art can apply the present disclosure to these cases accordingly.

The model data 5 comprise cardinal features 240,241,244, 246 corresponding to the respective cardinal features 140, 141,144,146 in the acquired point cloud. For the sake of transparency the corresponding cardinal features are matching perfectly. The person skilled in the art can apply the present disclosure for cases where the cardinal features are only matching partially.

Figure 6:
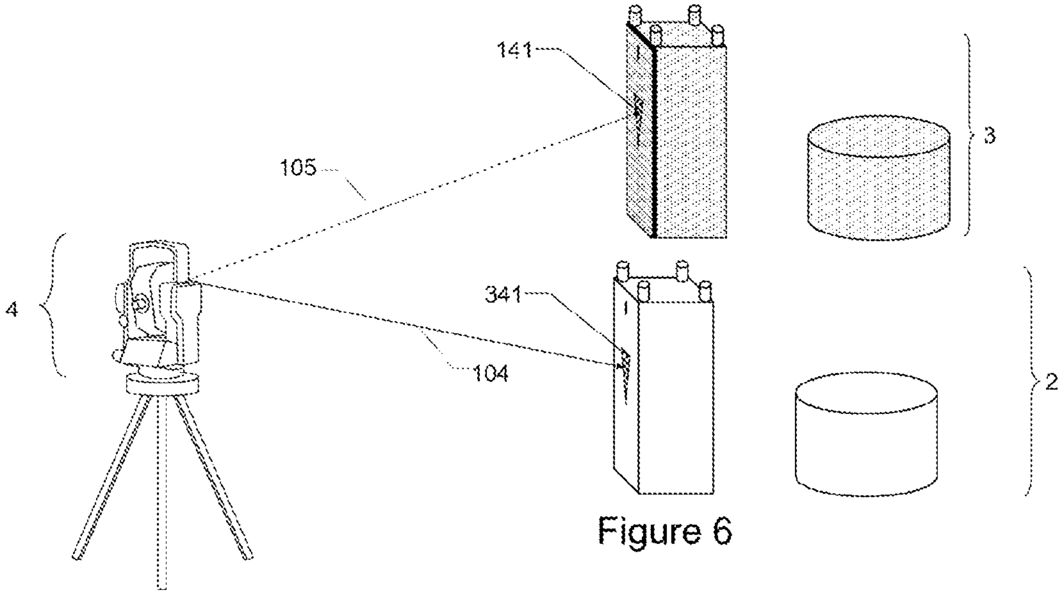
FIG. 6 shows the schematics of correcting inaccuracies of point cloud data by the single point measuring functionality.

FIG. 6 depicts a situation, where the acquired point cloud data 3 is erroneously calculated e.g. displaced as compared to the real positions in the setting 2. The displacement depicted in FIG. 6 is exaggerated to show the method in a more transparent manner. Measurement errors other than displacement might also occur during the acquisition of the point cloud 3, in particular orientation differences. The present disclosure might be applied to these cases accordingly.

The survey instrument 4 according to the present disclosure comprises a single point measuring functionality. The single point measuring functionality might be utilized to carry out a control of the stationing by the steps of a.) selecting one or more identified cardinal features, e.g. an identified reference marker 141, in the point cloud 3, b.) targeting the one or more identified cardinal features 141 by the single point measuring functionality, if the real position 104 of the physical feature 341 deviates strongly from the expected position 105 based on the point cloud a feature search might be necessary, c.) updating the acquired point cloud 3 data based on the real position 104 of the at least one cardinal features 141/341.

Figure 7:
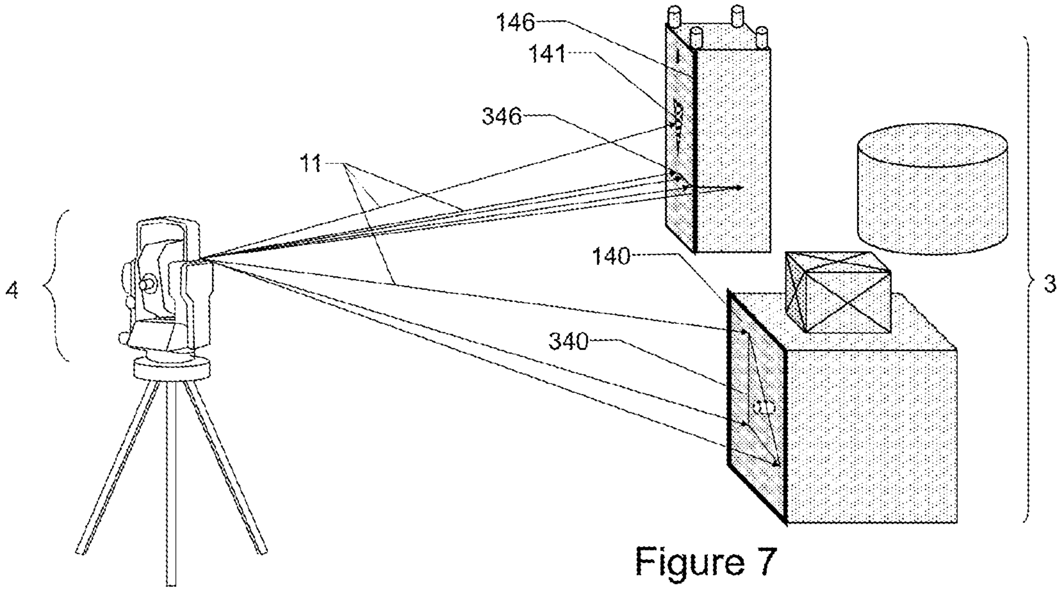
FIG. 7 depict some example of verification measurements with the single point measuring functionality for different types of cardinal features.

FIG. 7 depict the point cloud 3 with a set of cardinal features 140,141,146 whose position are to be controlled with the single point measuring functionality. For reasons of transparency neither the model data, nor the actual real space coordinates of the objects are depicted in this schematics. It is clear for the skilled person that the actual measurement process involves real space objects and the point cloud 3 only provides targeting information for the TPS 4.

In the depicted embodiment the single point measuring functionality drives the measuring beam 11 through a measuring pattern 340,346 associated with the type of the feature. The reference marker 141 can be seen as a point-like feature, wherein one point represents its coordinates. Furthermore, the reference marker 141, due to its design, is precisely targetable. The edge 146 might be represented by determining a vertex position obtained from a continuous scan 346 across the edge 146. The coordinates of the flat surface 140 might be derived from measuring the coordinates of at least three points in that surface 340. The depicted control measurement patterns are for illustrative purposes only, the skilled person could provide many similar or alternative variants, in particular for different types of cardinal features than the ones depicted in FIG. 7.

Figure 8A:
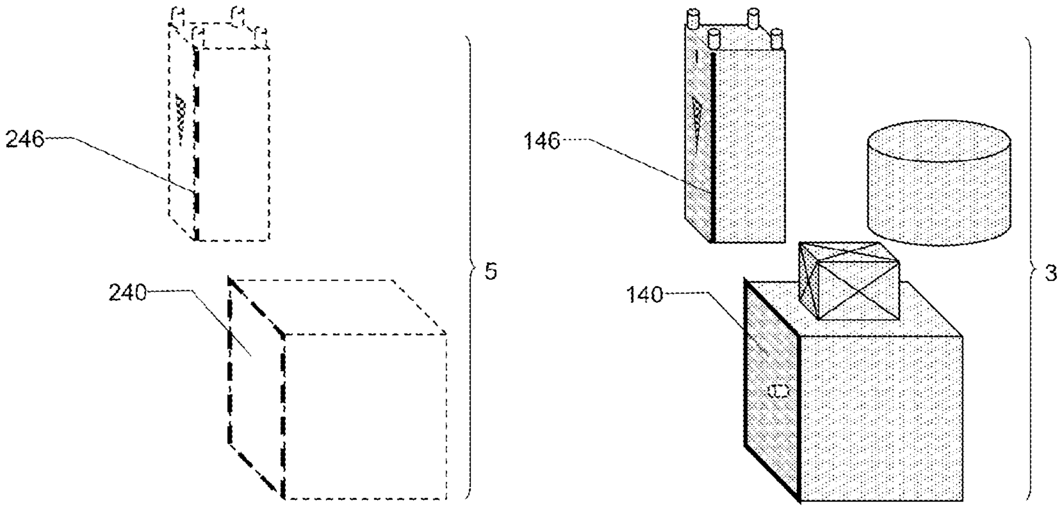
FIG. 8*a* shows two possible cardinal features to match point cloud data with model data.

FIG. 8*a* shows the model data 5 with two cardinal features 240,246 and the acquired point cloud data 3 with the respective cardinal features 140,146. For brevity and transparency reasons the orientation (e.g. the zenith and the north direction) of the model data 5 and the point cloud 3 are aligned. The specific features of the matching process wherein the orientation is not beforehand aligned might be applied accordingly.

Figure 8B:
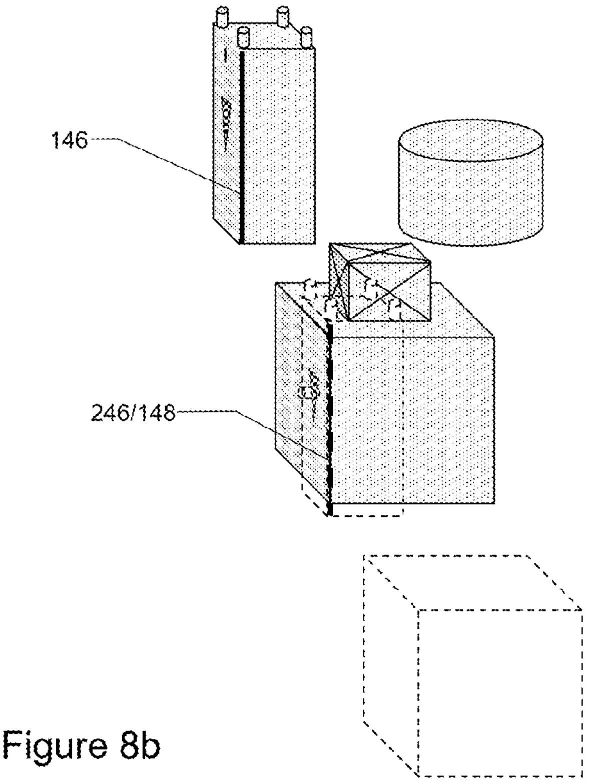
FIG. 8*b* shows an example where due to the low score of applicability a mismatch between model data and point cloud data arises.

FIG. 8*b* depicts a situation wherein the edge 246 is utilized to align the model data with the acquired point cloud. Since the setting, and therefore the acquired point cloud also, comprise many vertical edge these are non-unique features which might lead to the here depicted misalignment. Instead of aligning the edge in the model data 246 correctly to the respective edge in point cloud 146, it is not unreasonable to match it to a similar edge e.g. 148. This is especially important during a training of a matching algorithm, thus edges might be characterized by low score of applicability.

Figure 8C:
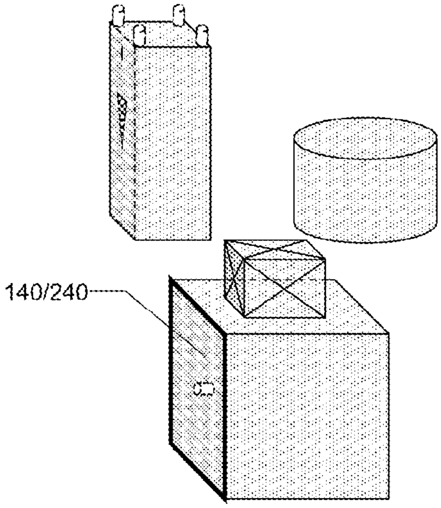
FIG. 8*c* shows and example of a successful matching.

FIG. 8*c* depicts an alignment based on a flat surface 240. Flat surfaces with defined geometry are rare features. The likelihood of correctly matching a flat surface in the model data 240 with a respective flat surface in the acquired point cloud is 140 higher than in than in the case of the edge depicted in FIG. 8*b*. This is especially important during a training of a matching algorithm. Thus, flat surfaces with defined geometry might be characterized by high score of applicability.

Figure 9A:
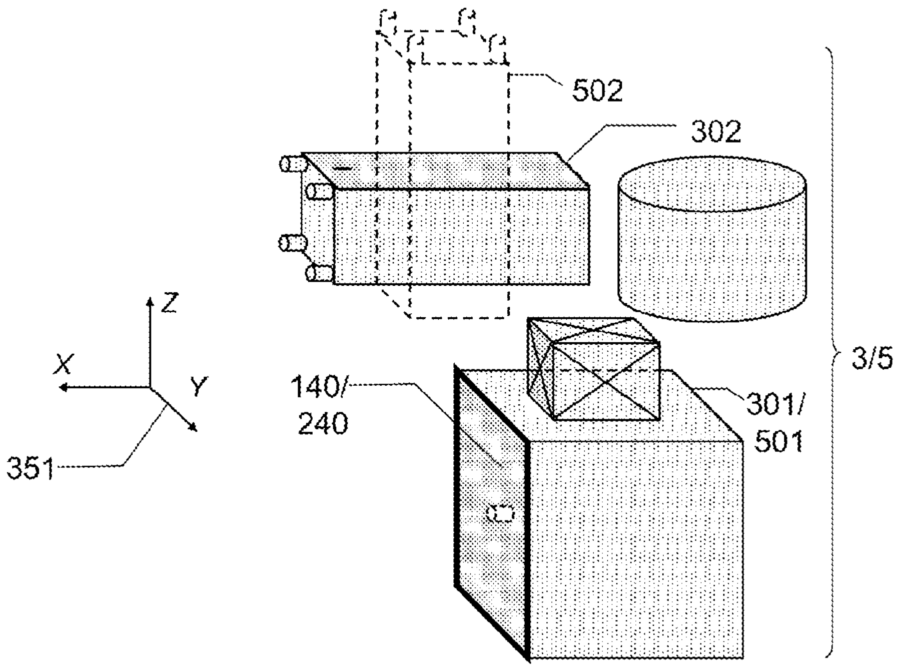
FIG. 9*a* shows a setting with a misaligned object.

FIG. 9*a* shows a point cloud 3 referenced to the model data 5 in a first reference framework 351, by matching the respective cardinal features with high score of applicability, namely a flat surface with a specific geometry respectively in the point cloud 140 and in the model data 240. The model 501 and point cloud representation of the boxy object 301 matches perfectly, however a misaligned object, the beam with the pins, is oriented differently in the point cloud 302 and the model data 502. The misaligned object might further have different position and/or might have missing or additional features. The misaligned object 502 might be excluded from the matching. By segmenting the point cloud 3 it becomes clear that the segment representing the misaligned object 502 might be matched with the point cloud counterpart 302 after and pose change.

Figure 9B:
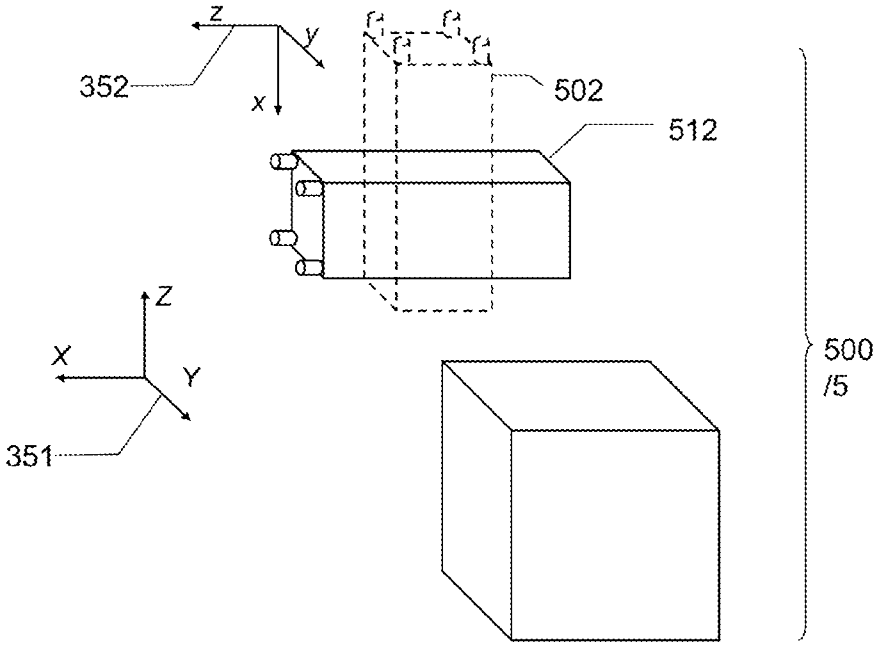
FIG. 9*b* shows a second orientation with improved matching for the misaligned object.

FIG. 9*b* shows the original model data 5 with dashed and the updated model data 500 with solid lines. The updated model data 500 differs from the original model data by the fact the misaligned object 502 is now represented according to its true pose, i.e. on the basis of the second reference framework 352 differing from the first reference framework 351. The correctly represented misaligned object 512 is still model and not measurement data, i.e. other than correctly referencing its pose by translation and rotation operations it possesses the same properties as the misaligned object 502. The correctly represented misaligned object 512 might be utilized in later measurements e.g. to determine manufacturing errors.

Although aspects are illustrated above, partly with reference to some specific embodiments, it must be understood that numerous modifications and combinations of different features of the embodiments can be made. All of these modifications lie within the scope of the appended claims.

The invention claimed is:

1. A survey instrument comprising:
a single point measuring functionality;
a point cloud measuring functionality;
a communication interface; and
a computing unit,
wherein the point cloud measuring functionality:
having a first measuring axis and being configured to emit a scanning beam along the first measuring axis,
being configured to generate dense point cloud data comprising coordinate data of a plurality of point cloud object points by advancing the first measuring axis along a scanning pattern, wherein the point cloud object points representing a topography of a setting,
wherein the single point measuring functionality:
having a second measuring axis and being configured to emit a measuring beam along the second measuring axis, wherein the first measuring axis being referenced to the second measuring axis,
being configured to target a single point target by aligning the second measuring axis to the single point target and to generate single point measurement data comprising coordinate data of the single point target,
the communication interface being configured to receive model data representing at least a part of the setting, wherein the model data comprising referencing data to an external coordinate system,
the computing unit being configured to identify cardinal features in the point cloud data and being configured to identify cardinal features in the model data,
the survey instrument being configured to execute a stationing functionality comprising the automatic execution of the steps of:
retrieving the model data representing at least a part of the setting and comprising referencing data to the external coordinate system,
acquiring the point cloud data representing the topography of the setting by the point cloud measuring functionality,
identifying a plurality of cardinal features in the acquired point cloud data by the computing unit,
segmenting the point cloud data into a plurality of fractions of the point cloud data,
providing a local matching index for at least one fraction of the point cloud data, wherein the local matching index being based on:
a weighted deviation of coordinate data of point cloud object points of the point cloud data from the model data, and/or
a weighted deviation of at least one identified cardinal features respectively in the point cloud data and in the model data
reducing the point cloud data by excluding fractions of the point cloud data based on the local matching index and a deviation threshold,
merging the acquired point cloud data with the model data by finding correspondences between the identified cardinal features in the reduced point cloud data and the respective cardinal features in the model data by the computing unit,
providing referenced point cloud data based on the merging of the acquired point cloud data with the model data,
deriving referenced pose data for the survey instrument based on the referenced point cloud data, and
utilizing the referenced pose data of the survey instrument for performing subsequent operation of the single point and the point cloud measuring functionalities
the stationing functionality further comprising:

selecting at least one identified cardinal feature by the computing unit, targeting the at least one selected cardinal feature with the single point measuring functionality and generating single point measurement data comprising coordinate data of the at least one selected cardinal feature, updating the acquired point cloud data based on the single point measurement data comprising the coordinate data of the at least one selected cardinal feature, wherein the instrument further configured to perform:

identifying a misaligned object, the misaligned object having a different orientation and/or position in the model data and in the referenced point cloud, wherein the updated referenced point cloud data having a first reference framework, at least one excluded fraction representing the misaligned object having an improved local matching index, below a deviation threshold, with respect to a second reference framework differing from the first reference framework, and requesting, and on approval performing an update for the model data on the basis of a pose of the misaligned object in the updated referenced point cloud.

2. The survey instrument according to claim 1 further comprising:

a base, a frame being mounted on the base and configured for being rotatable relative to the base by a motorized rotation axis, wherein the motorized rotation axis providing a rotation for the first and second measuring axis, a single point measuring unit, in particular a common measuring unit, being mounted on a motorized tilting axis of the frame, wherein:

the motorized tilting axis providing a tilting of the second measuring axis, in particular further providing a tilting of the first measuring axis, the single point measuring unit, in particular the common measuring unit, comprising a laser rangefinder configured to provide a distance of the single point target to the survey instrument, in particular a distance of the point cloud object points to the survey instrument, a first angle sensor configured for providing rotation angle data for calculating the orientation of the first and second measuring axis, a second angle sensor configured for providing tilting angle data for calculating the orientation of the second measuring axis, and in particular the orientation of the first measuring axis.

3. The survey instrument according to claim 2, wherein the single point and the point cloud measuring functionalities utilizing a common laser diode.

4. The survey instrument according to claim 1, wherein the point cloud measuring functionality being configured to identify retroreflective targets in the setting, in particular by analyzing the reflected scanning beam.

5. The survey instrument according to claim 4, wherein:

the model data comprising position information of one or more retroreflective targets in the setting, the identified cardinal features comprising at least one retroreflective target, the stationing functionality further comprising:

targeting at least one of the at least one retroreflective target comprised by the identified cardinal features with the single point measuring functionality and generating single point measurement data comprising coordinate data of at least one targeted retroreflective target, updating the acquired point cloud data based on the single point measurement data comprising the coordinate data of the at least one targeted retroreflective target.

6. The survey instrument according to claim 1, the survey instrument comprising an inclinometer, the stationing functionality further comprising:

providing a gravity vector by the inclinometer, updating the acquired point cloud data representing the topography of the setting based on the provided gravity vector, the survey instrument comprising an electronic compass, the stationing functionality further comprising:

providing a north direction by the compass, updating the acquired point cloud data representing the topography of the setting based on the provided north direction.

7. The survey instrument according to claim 1 the survey instrument comprising an imaging functionality wherein:

the optical axis of the imaging functionality defining a third measuring axis, wherein the third measuring axis being referenced to the second measuring axis, the imaging functionality being configured to detect construction markings, in particular pencil marks and/or chalk marks, and/or nonreflective tapes, and to provide imaging data comprising targeting direction data of the identified construction markings, the model data comprising coordinates of one or more construction markings, the stationing functionality further comprising:

acquiring the imaging data by the imaging functionality, merging the acquired imaging data with the model data by matching the targeting direction data of the identified construction markings with the respective coordinates of the construction markings in the model data, providing an assessment regarding a deviation of model data merged with the targeting direction data of the identified construction markings and the referenced point cloud data.

8. A method of stationing a geodetic survey instrument, the method comprising:

retrieving model data representing at least a part of the setting and comprising referencing data to an external coordinate system, acquiring dense point cloud data representing a topography of the setting, identifying a plurality cardinal features in the acquired point cloud data, merging the acquired point cloud data with the model data by finding correspondence between the identified cardinal features in the point cloud data and the respective cardinal features in the model data, segmenting the point cloud data into a plurality of fractions of the point cloud data, providing a local matching index for at least one fraction of the point cloud data, wherein the local matching index being based on:

a weighted deviation of coordinate data of point cloud object points of the referenced point cloud data from the model data, and/or a weighted deviation of the identified cardinal features respectively in the point cloud data and in the model data reducing the point cloud data by excluding fractions of the point cloud data based on the local matching index and a deviation threshold, providing referenced point cloud data based on the merging of the reduced point cloud data with the model data, deriving referenced pose data for the survey instrument for performing subsequent operation of the single point and the point cloud measuring functionalities based on the referenced point cloud data, wherein the method further comprises automatically selecting at least one identified cardinal feature, targeting the at least one selected cardinal feature with the single point measuring functionality and generating single point measurement data comprising coordinate data of the at least one selected cardinal feature, updating the referenced point cloud data based on the single point measurement data comprising the coordinate data of the at least one selected cardinal feature, wherein the method further comprises:

identifying a misaligned object, the misaligned object having a different orientation and/or position in the model data and in the referenced point cloud wherein:

the updated referenced point cloud data having a first reference framework, and at least one excluded fraction representing the misaligned object having an improved local matching index, below a deviation threshold, with respect to a second reference framework differing from the first reference framework, and requesting, and on approval performing an update for the model data on the basis of a pose of the misaligned object in the updated referenced point cloud.

9. The method according to claim 8, wherein the method further comprises a step of providing a feedback by graphically indicating the misaligned object.

10. The method according to claim 8, wherein finding correspondences between the identified cardinal features in the point cloud data and the respective cardinal features in the model data being provided by a matching algorithm, wherein the matching algorithm being configured to be trained by machine learning to associate the identified cardinal features in the point cloud data with the respective cardinal features in the model data based on an evaluation of the net matching index, wherein the net matching index being based on the local matching indexes.

11. The method according to claim 10, the machine learning further comprising:

providing a score of applicability for each of the identified cardinal features comprising information regarding an estimated reduction of the local and/or the net matching index by matching the given cardinal feature to the respective cardinal feature in the model data, providing a feedback to the machine learning based on the score of applicability and further based on an actual reduction of the local and/or the net matching index by matching the given cardinal feature to the respective cardinal feature in the model data.

12. The method according to claim 10, wherein the machine learning further comprising a verification measurement, wherein the verification measurement comprising the steps of:

selecting a set of verification features comprising one or more identified cardinal features in the model data, providing single point measurement data comprising coordinate data of the set of verification features by the single point measuring functionality, providing deviation data based on the coordinate data of the set of verification features measured by the single point measuring functionality and in the referenced point cloud data, providing matching quality data based on the deviation data, providing training information for the matching algorithm based on the matching quality data.

13. The method according to claim 11, wherein the machine learning further comprising a verification measurement, wherein the verification measurement comprising the steps of:

selecting a set of verification features comprising one or more identified cardinal features in the model data, providing single point measurement data comprising coordinate data of the set of verification features by the single point measuring functionality, providing deviation data based on the coordinate data of the set of verification features measured by the single point measuring functionality and in the referenced point cloud data, providing matching quality data based on the deviation data, providing training information for the matching algorithm based on the matching quality data.

14. A computer program product for a survey system stored in a non-transitory machine readable medium, which when executed by a computing unit of a surveying instrument, causes the automatic execution of the computational steps of the method according to claim 8.

15. A computer program product for a survey system stored in a non-transitory machine readable medium, which when executed by a computing unit of a surveying instrument, causes the automatic execution of the computational steps of the method according to claim 12.

16. A survey instrument comprising:

a single point measuring functionality;

a point cloud measuring functionality;

a communication interface; and a computing unit, wherein the point cloud measuring functionality:

having a first measuring axis and being configured to emit a scanning beam along the first measuring axis, being configured to generate point cloud data comprising coordinate data of a plurality of point cloud object points by advancing the first measuring axis along a scanning pattern, wherein the point cloud object points representing a topography of a setting, wherein the single point measuring functionality:

having a second measuring axis and being configured to emit a measuring beam along the second measuring axis, wherein the first measuring axis being referenced to the second measuring axis, being configured to target a single point target by aligning the second measuring axis to the single point target and to generate single point measurement data comprising coordinate data of the single point target, the communication interface being configured to receive model data representing at least a part of the setting, wherein the model data comprising referencing data to an external coordinate system, the computing unit being configured to identify cardinal features in the point cloud data and being configured to identify cardinal features in the model data, the survey instrument being configured to execute a stationing functionality comprising the automatic execution of the steps of:

retrieving the model data representing at least a part of the setting and comprising referencing data to the external coordinate system, acquiring the point cloud data representing the topography of the setting by the point cloud measuring functionality, identifying a plurality of cardinal features in the acquired point cloud data by the computing unit, segmenting the referenced point cloud data into a plurality of fractions of the referenced point cloud data, providing a local matching index for at least one fraction of the referenced point cloud data, wherein the local matching index being based on;

a weighted deviation of coordinate data of point cloud object points of the referenced point cloud data from the model data, and/or a weighted deviation of the identified cardinal features respectively in the referenced point cloud data and in the model data, reducing the referenced point cloud data by excluding fractions of the referenced point cloud data based on the local matching index, in particular wherein the local matching index exceeding a deviation threshold;

merging the acquired point cloud data with the model data by finding correspondences between the identified cardinal features in the reduced point cloud data and the respective cardinal features in the model data by the computing unit, providing referenced point cloud data based on the merging of the acquired point cloud data with the model data, deriving referenced pose data for the survey instrument based on the referenced point cloud data, and utilizing the referenced pose data of the survey instrument for performing subsequent operation of the single point and the point cloud measuring functionalities, wherein the instrument is further configured to perform:

identifying a misaligned object, the misaligned object having a different orientation and/or position in the model data and in the referenced point cloud, wherein:

the updated referenced point cloud data having a first reference framework, at least one excluded fraction representing the misaligned object having an improved local matching index, below a deviation threshold, with respect to a second reference framework differing from the first reference framework, and graphically indicating the misaligned object, and requesting, and on approval performing an update for the model data on the basis of a pose of the misaligned object in the updated referenced point cloud.

* * * * *